US012207043B2

(12) United States Patent
Barton et al.

(10) Patent No.: US 12,207,043 B2
(45) Date of Patent: *Jan. 21, 2025

(54) SPEAKER WITH OBLIQUE MOUNTED BASS DRIVER

(71) Applicant: Lenbrook Industries Limited, Pickering (CA)

(72) Inventors: Paul Barton, Port Perry (CA); Matthew Simmonds, Toronto (CA); Gordon Van Kessel, Colborne (CA)

(73) Assignee: Lenbrook Industries Limited, Pickering (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,974

(22) Filed: Apr. 5, 2023

(65) Prior Publication Data

US 2023/0336910 A1 Oct. 19, 2023

Related U.S. Application Data

(63) Continuation of application No. 17/704,518, filed on Mar. 25, 2022, now Pat. No. 11,627,407.

(51) Int. Cl.
*H04R 1/24* (2006.01)
*H04R 1/02* (2006.01)
*H04R 1/28* (2006.01)

(52) U.S. Cl.
CPC ............... *H04R 1/24* (2013.01); *H04R 1/025* (2013.01); *H04R 1/288* (2013.01)

(58) Field of Classification Search
CPC ............ H04R 1/2803; H04R 2201/021; H04R 1/2823; H04R 1/2826; H04R 1/2846;
(Continued)

(56) References Cited

U.S. PATENT DOCUMENTS 4,146,111 A * 3/1979 Mae ..................... H04R 1/2834 181/154
4,753,317 A * 6/1988 Flanders .................. H04R 5/02 181/154
(Continued)

OTHER PUBLICATIONS

Mirage, "Mirage MX miniature High-Performance Speaker (Single, Black) (Discontinued by Manufacturer)," Amazon WebPage, (9 pages) (2021).

*Primary Examiner* — Gerald Gauthier
(74) *Attorney, Agent, or Firm* — Erik A. Huestis; Sameer K. Pai; Foley Hoag LLP

(57) ABSTRACT

A speaker device includes a bass driver mounted in the internal space of an enclosure for generating a bass output. The bass driver has a central axis along which a piston area of the bass driver actuates oriented at an oblique angle relative to the bottom end of the enclosure to increase bass driver size and acoustic output and to reduce acoustic frequency distortion by providing a varying distance between the bass driver and the top and bottom ends of the enclosure. An elastomeric reflector-damper plate is spaced apart from the bass driver in the internal space in the enclosure. The reflector-damper plate radially disperses low to midrange audio frequencies of the bass output of the bass driver around the enclosure to further reduce acoustic frequency distortion. Electronic subsystems in the internal space coupled to the bass driver receive and process input audio signals to be rendered by the bass driver.

53 Claims, 6 Drawing Sheets

(58) Field of Classification Search
CPC . H04R 1/28; H04R 1/24; H04R 1/025; H04R 1/2888; H04R 1/34; H04R 1/345; H04R 1/26; H04R 1/2834; H04R 1/288; H04R 1/403; H04R 5/02
See application file for complete search history.

(56) References Cited

U.S. PATENT DOCUMENTS

| | | | | |
|---|---|---|---|---|
| 6,621,909 | B1 * | 9/2003 | Webb | H04R 1/403 381/342 |
| 8,634,586 | B2 * | 1/2014 | Smith | H04R 1/26 381/89 |
| 10,440,465 | B2 * | 10/2019 | Peace, Jr. | H04R 3/04 |
| 10,595,120 | B1 | 3/2020 | Combest et al. | |
| 11,627,407 | B1 * | 4/2023 | Barton | H04R 1/288 381/186 |
| 2004/0252856 | A1 | 12/2004 | Masuda | |
| 2008/0144873 | A1 * | 6/2008 | Grant | H04R 1/025 381/350 |
| 2011/0019862 | A1 * | 1/2011 | Smith | H04R 1/2842 381/386 |
| 2013/0259258 | A1 * | 10/2013 | Ludwig | H04R 1/2834 381/86 |
| 2016/0088386 | A1 * | 3/2016 | Crosswell | H04R 1/025 381/349 |
| 2017/0325019 | A1 * | 11/2017 | Bezzola | H04R 1/345 |
| 2020/0084538 | A1 * | 3/2020 | Brown | H04R 1/345 |
| 2023/0336910 | A1 * | 10/2023 | Barton | H04R 1/288 |

* cited by examiner

SPEAKER WITH OBLIQUE MOUNTED BASS DRIVER

CROSS-REFERENCE TO RELATED APPLICATIONS

This application is a continuation of U.S. Non-Provisional application Ser. No. 17/704,518, filed Mar. 25, 2022, the contents of each of which are hereby incorporated by reference herein in their entirety.

BACKGROUND

The present application relates generally to audio speakers and, more particularly, to a speaker with an oblique mounted bass driver or woofer.

Consumers have had limited accessibility to High Resolution digital audio (audio files with greater than 48 kHz sample rate or higher than 16-bit audio bit depth). Lenbrook Industries Limited (owner of NAD Electronics and Bluesound Music Systems and the applicant of the present application) began development of a new type of High Resolution media audio playback system in 2004 and demonstrated such a system in 2009. By 2011, the NAD Masters Digital Suite Home Sound System enabled consumers to experience music via one or more networked playback devices. The system's BluOS operating system was expanded to more affordable devices with the introduction of the Bluesound brand in 2012. Through a software control application installed on a controller (e.g., IR remote, wall mounted controller, smartphone, tablet, computer, voice input device), consumers can play what they desire in any room having a networked playback device. They can access High Resolution music files by each room with a playback device and group rooms together for synchronous playback of the same music. The BluOS modular software design also allows the unification of audio video receiver (AVR) devices, reducing the cost of software development compared to highly proprietary MCU/DSP software currently used throughout the AVR industry.

Recent advances in the emerging smart speaker consumer product category have placed immense pressure on acoustics designers to reduce loudspeaker cabinet sizes without compromising audio performance—particularly in the area of low-frequency acoustic bass output.

Fundamentally, acoustic design principles require loudspeaker enclosures to have a larger internal air volume with a large active radiator (loudspeaker 'driver' component) to deliver a specific bass frequency response. As such, the simplest known solution is to design the largest speaker enclosure and driver component to achieve the desired low frequency bass response. Though this is an acceptable and often lowest cost solution in some applications, smart speakers are expected to have a minimal physical size while maintaining the highest possible low frequency bass output.

Several established solutions exist for achieving a desired low frequency output, without increasing a loudspeaker's enclosure and driver component size. These include selection of driver components with larger physical excursion capability to move and displace more air volume for a given driver component piston diameter. This also typically increases the size of a higher-powered audio amplifier device to push the driver piston to its maximum excursion capability. In addition to the cost of a larger audio amplifier circuit, increasing the driver excursion adds undesirable distortion. Extensive techniques have been employed to reduce this distortion, including digitally pre-processing the audio signal relative to known distortion characteristics of the driver component at its excursion limits.

Psychoacoustic methods have also been employed, dating to at least the early 1970s in automotive audio applications. Faced with a similar design constraint, which limits the maximum physical size of the loudspeaker system (yet demanding the highest possible low-frequency audio output), audio designers found that synthesizing an audio signal an octave above fundamental bass tones in the original music signal convinced the listener they were hearing extended low-frequencies that were below the output capability of an automobile's relatively small loudspeaker system. Though effective, this approach ultimately does not deliver a natural, musical bass quality that a larger speaker driver and cabinet would.

BRIEF SUMMARY OF THE DISCLOSURE

A speaker device in accordance with one or more embodiments includes an enclosure having a top end, an opposite bottom end, and one or more sides connecting the top and bottom ends to define an internal space. A bass driver is mounted in the internal space for generating a bass output. The bass driver has a central axis along which a piston area of the bass driver actuates oriented at an oblique angle relative to the bottom end of the enclosure to increase acoustic output and to reduce acoustic frequency distortion by providing a varying distance between the bass driver and the top and bottom ends of the enclosure. An elastomeric reflector-damper plate is spaced apart from the bass driver in the internal space in the enclosure. The reflector-damper plate is configured to radially disperse low to midrange audio frequencies of the bass output of the bass driver around the enclosure to further reduce acoustic frequency distortion. The device includes electronic subsystems in the internal space coupled to the bass driver for receiving and processing input audio signals to be rendered by the bass driver.

A speaker device in accordance with one or more embodiments includes an enclosure having a top end, an opposite bottom end, and one or more sides connecting the top and bottom ends to define an internal space. A bass driver is mounted in the internal space of the enclosure for generating a bass output. The bass driver has a central axis along which a piston area of the bass driver actuates oriented at an oblique angle relative to the bottom end of the enclosure to increase bass driver size and acoustic output and to reduce acoustic frequency distortion by providing a varying distance between the bass driver and the top and bottom ends of the enclosure. An elastomeric reflector-damper plate is spaced apart from and above the bass driver in the internal space in the enclosure. The reflector-damper plate is configured to radially disperse low to midrange audio frequencies of the bass output of the bass driver in a controlled distribution pattern around the enclosure to further reduce acoustic frequency distortion. Electronic subsystems are provided in the internal space of the enclosure beneath the bass driver. The electronic subsystems are coupled to the bass driver for receiving and processing input audio signals to be rendered by the bass driver.

BRIEF DESCRIPTION OF THE DRAWINGS

Like or identical reference numbers are used to identify common or similar elements.

DETAILED DESCRIPTION

Various embodiments disclosed herein relate to a speaker with an oblique mounted woofer or bass driver. This design configuration allows a bass driver with an increased piston area to be mounted in a small smart speaker enclosure. The footprint area of a smart speaker enclosure is crucial in reducing its perceived physical bulkiness, and the bass driver component mounting satisfies this requirement while naturally increasing the system's bass output. This approach introduces almost none of the costs of the prior techniques for increasing bass output discussed in the background section above.

Modern smart speakers typically have a generally cylindrical form, and a speaker system designer faces two basic choices to mount a bass driver component. Mounting the bass driver such that its piston area actuates horizontally ('forward firing') minimizes the physical footprint of the enclosure yet maximizes its height. Mounting the bass driver such that its piston area actuates vertically ('upward firing') minimizes the height of the speaker enclosure while maximizing its footprint. The latter mounting method is widely employed in popular smart speakers today.

Speaker devices in accordance with various embodiments include a bass driver that is mounted in the speaker enclosure at an oblique angle, rather than in a horizontal or vertical orientation. This driver orientation permits use of a driver with a larger piston area in the speaker enclosure. An increase in a bass driver piston area is significant because a driver component's lowest bass frequency output capability is a square function of the driver diameter. Maximizing driver piston area has significant technical advantages over the prior methods of reducing a smart speaker enclosure size in terms of reduced complexity, cost, and audio distortion.

Figure 1:
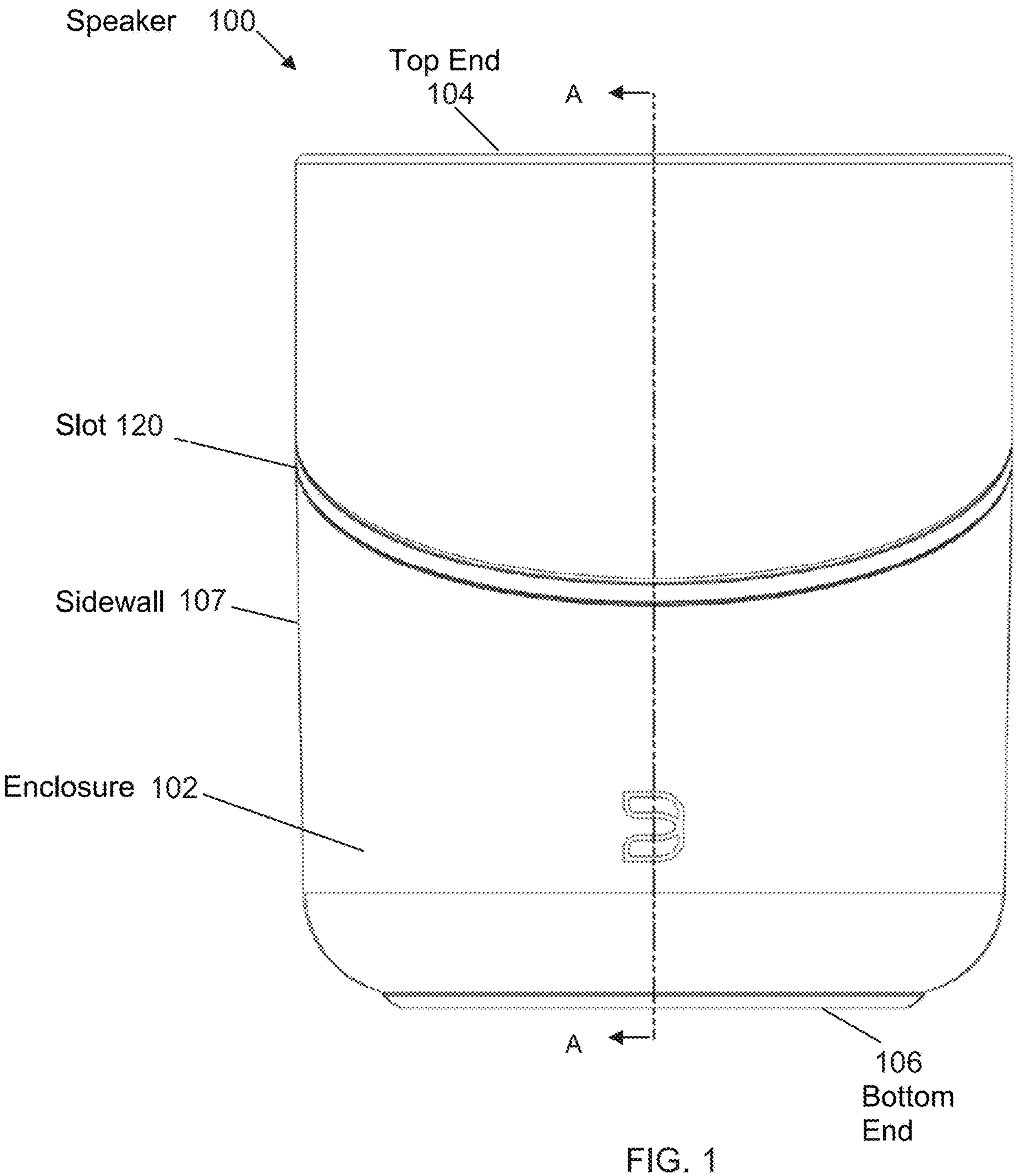
FIG. 1 is a front view of an exemplary speaker with an oblique mounted bass driver in accordance with one or more embodiments.
Figure 2:
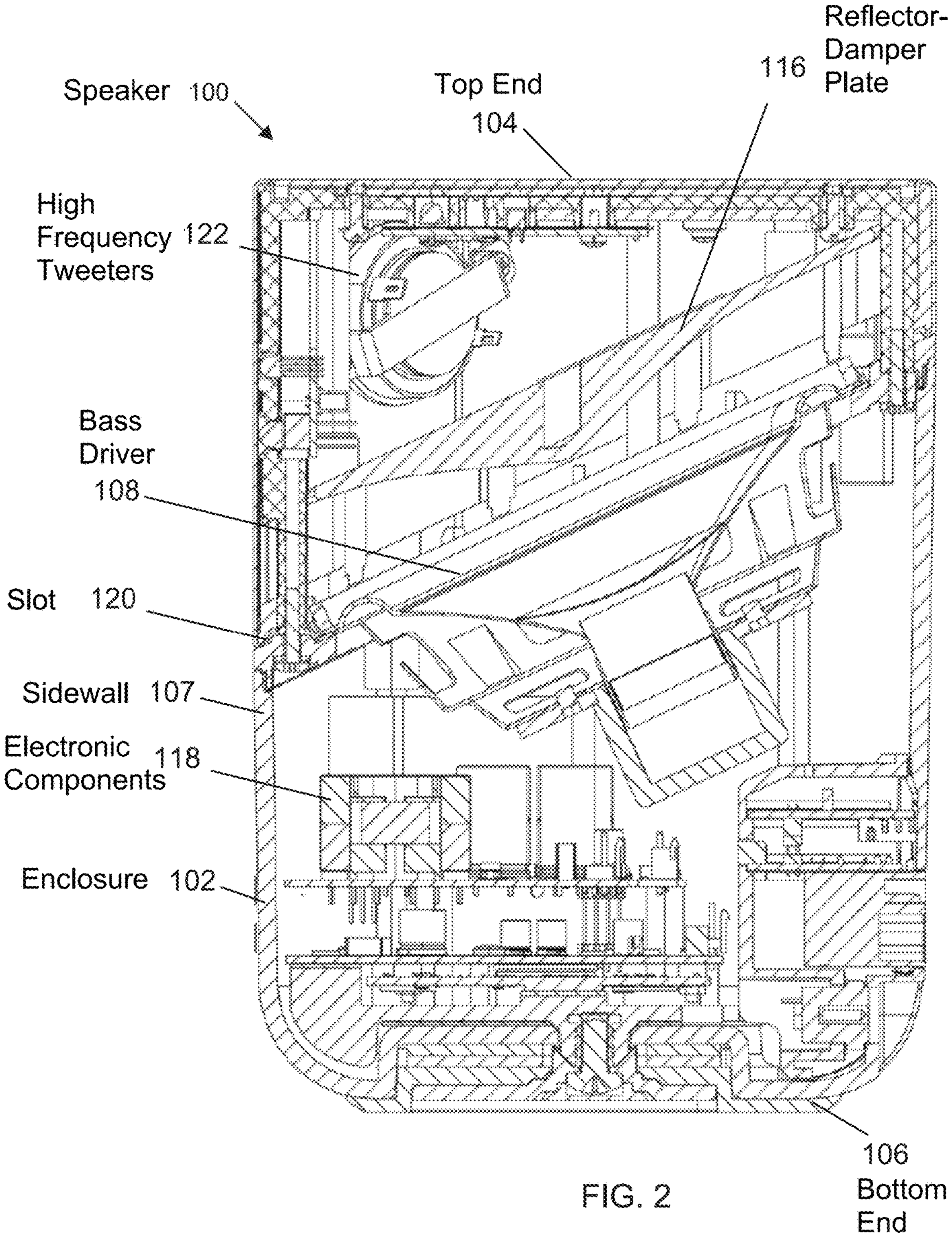
FIG. 2 is a cross-section view of the speaker taken generally along line A-A of FIG. 1.
Figure 3:
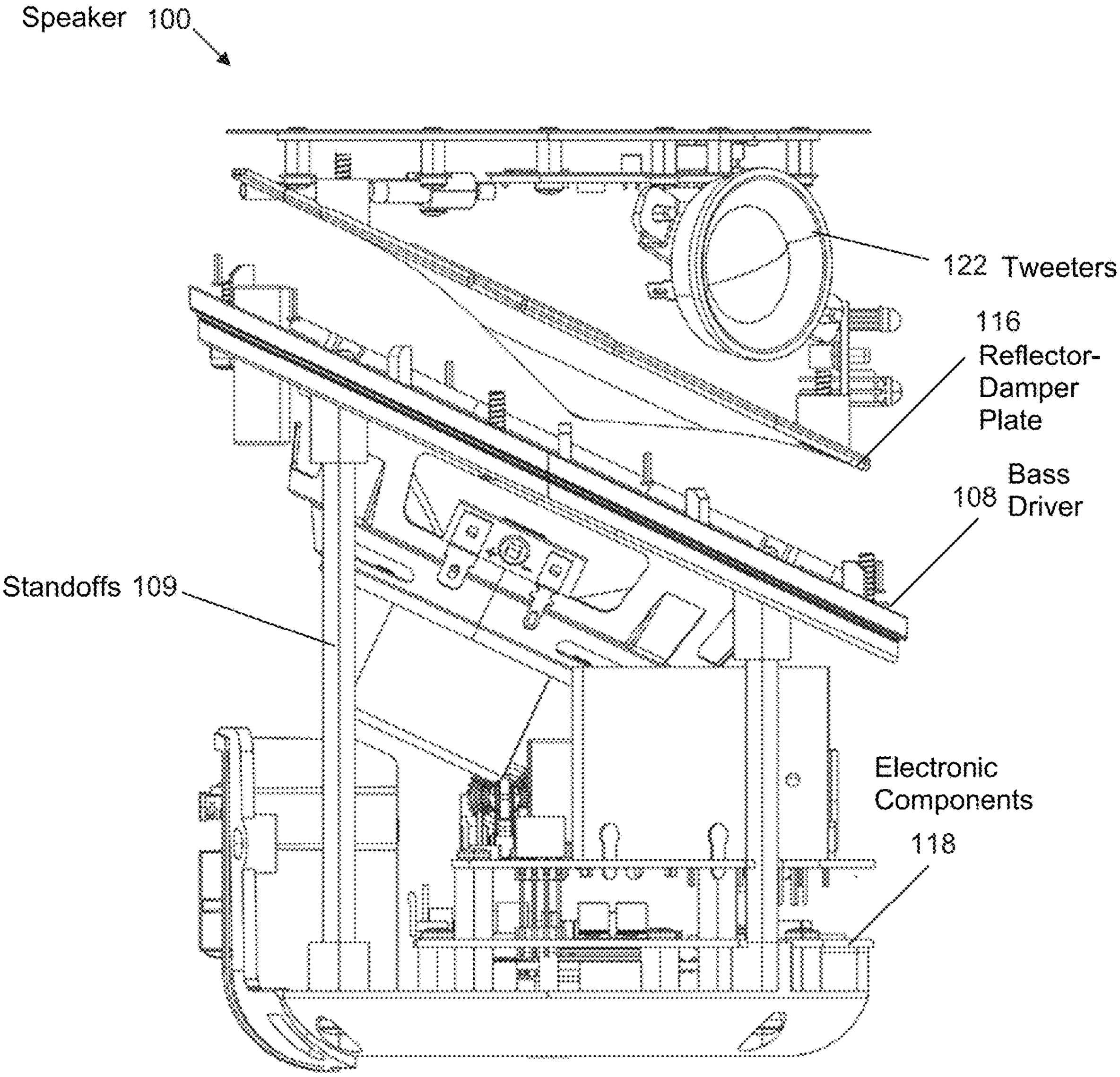
FIGS. 3 and 4 are side and front views, respectively, of the internal components of the speaker.
Figure 4:
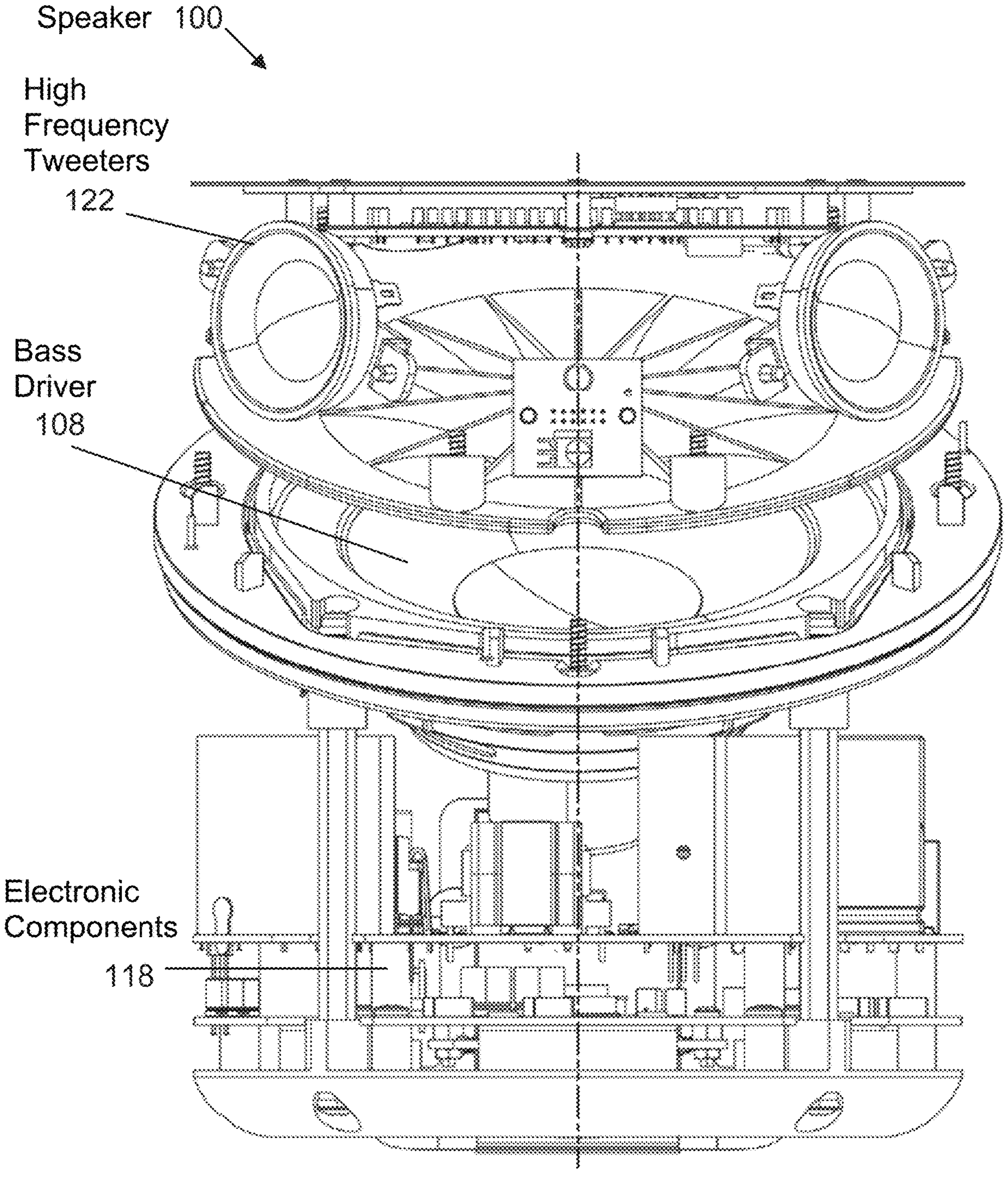
Figure 5:
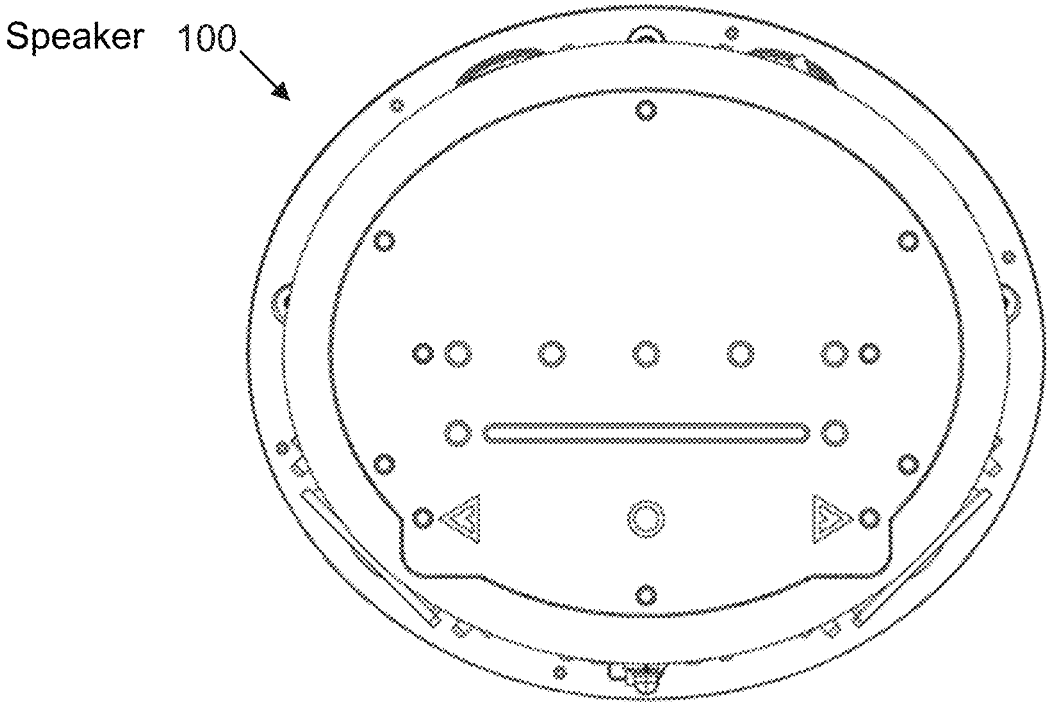
FIGS. 5 and 6 are top and bottom views, respectively, of the internal components of the speaker.
Figure 6:
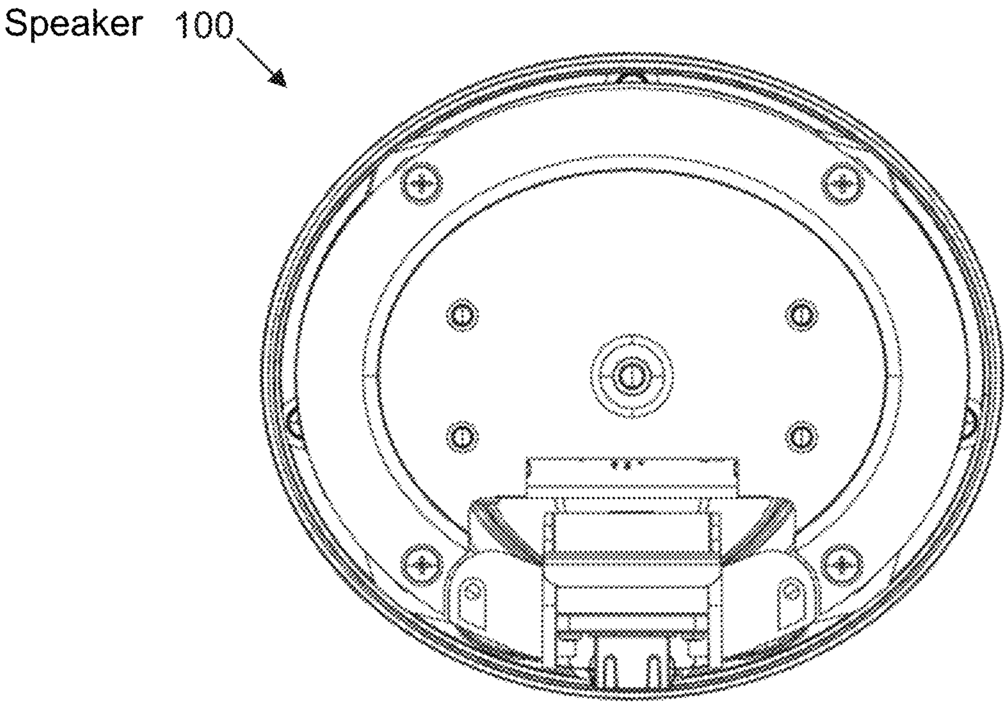
Figure 7:
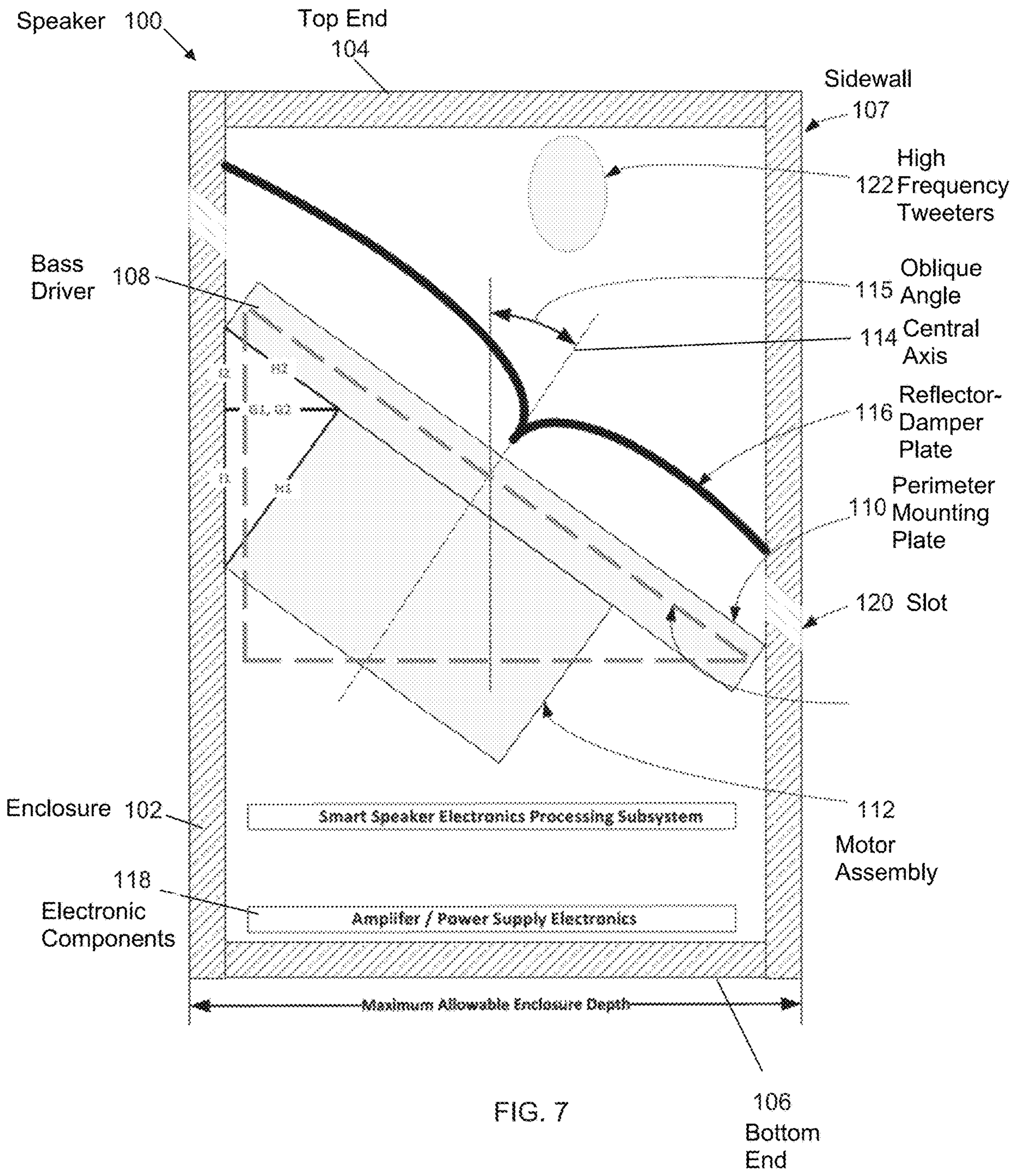
FIG. 7 is a schematic diagram illustrating the oblique mounting of the bass driver in the speaker.

FIG. 1 illustrates an exemplary speaker 100 containing an oblique mounted bass driver in accordance with one or more embodiments. FIG. 2 is a cross-section view of the speaker 100 taken generally along line A-A of FIG. 1. FIGS. 3, 4, 5, and 6 are side, front, top, and bottom views, respectively, of the internal components of the speaker 100. FIG. 7 is a schematic diagram illustrating use of a larger bass driver through oblique driver mounting.

The speaker 100 includes an enclosure or cabinet 102 depicted in FIGS. 1 and 2. The enclosure 102 can comprise various materials including, e.g., injection-molded plastic or wood. The enclosure 102 includes a top end 104, an opposite bottom end 106, and one or more sidewalls 107 connecting the top and bottom ends 102, 104 to define an internal space for holding the various speaker components.

A bass driver 108 (e.g., a subwoofer driver) is mounted in the internal space of the enclosure 102 on a set of standoffs 109. The bass driver 108 includes diaphragm (forming a piston area) and perimeter mounting plate 110 and a magnet and motor assembly 112. The bass driver 108 has a central axis 114 along which its piston area actuates. The central axis 114 is oriented at an oblique angle relative to the bottom end 106 of the enclosure 102 (or alternatively at an oblique angle 115 relative to a vertical axis of the speaker 100) as shown in FIG. 7. This oblique orientation enables use of a bass driver with a larger piston area in the enclosure 102 than a horizontally mounted upward-firing bass driver.

For instance, as illustrated in FIG. 7, mounting the bass driver 108 at a 45 degree angle in the enclosure (instead of a 0 degree (upward firing) mounting) enables use of a bass driver having double the piston area. The bass driver piston area can be calculated as follows:

$$\text{Bass driver piston surface area}=\pi[[\text{Cabinet Depth}/\text{COS(Driver Mounting Angle)}]/2]^2$$

If a mounting angle of 45 degrees is used for the bass driver, the woofer piston area is doubled. The larger piston area increases acoustic output without excessive driver excursion. The increased acoustic bass response from the larger piston area also avoids the need to rely on signal processing to extract more bass from smaller, vertically firing bass drivers.

Additionally, the oblique mounting reduces acoustic frequency distortion by providing a varying distance between the bass driver 108 and the top and bottom ends 104, 106 of the enclosure 102. The angled bass driver 108 distributes frequency distortion resulting from 'echoes' from the bass driver's energy reflecting off the inner bottom and top surfaces of the enclosure 102. A horizontally mounted bass driver 108 would have a uniform distance to the enclosure's inner top and bottom surfaces, which accentuates echoes at particular frequencies that have a wavelength close to these two distances. With an angled bass driver 108, these same upper and lower distances vary across the bass driver's diameter. This distributes the cabinet echo distortion frequency across the acoustic spectrum making them weaker compared to the overall music signal.

The oblique mounting also improves the omnidirectional dispersion of audio frequencies above 100 Hz, which improves perceived spaciousness of sound emitted by the speaker 100.

The oblique angle relative to the bottom end of the enclosure at which the bass driver 108 is mounted can vary depending on the particular size requirements and geometry of the enclosure 102. In the illustrative embodiment, the oblique angle is about 45 degrees.

An elastomeric reflector-damper plate 116 is also mounted in the internal space of the enclosure 102. The elastomeric reflector-damper plate 116 is mounted above and substantially parallel to the bass driver 108. The reflector-damper plate 116 is configured to radially disperse low to midrange audio frequencies of the bass output of the bass driver 108 around the enclosure 102 to further reduce acoustic frequency distortion. The elastomeric reflector-damper plate 116 distributes specific frequencies of the bass driver 108 in a controlled omnidirectional distribution pattern around the enclosure 102. The elastomeric reflector-damper plate 116 is configured to either reflect or absorb specific audio frequencies of the bass driver 108 to both smooth frequency response and reduce acoustic frequency distortion. In addition, the reflector-damper plate 116 reduces the strength of echoes in the enclosure 102 from the enclosure's upper inner wall.

In one or more embodiments, the elastomeric reflector-damper plate 116 comprises a siliconized rubber material with a specific Shore durometer specification. In one or more embodiments, the elastomeric reflector-damper plate 116 has a Shore durometer range of 70-90. It has been found that reflector plates made of stiff material (e.g., wood or plastic)

will produce acoustic frequency distortion in the speaker 100. Using a softer siliconized rubber reduces this acoustic distortion substantially, turning a reflector into a reflector-damper plate 116.

The speaker 100 includes electronic components 118 in the internal space of the enclosure 102 beneath the bass driver 108. The electronic components 118 can include, e.g., a network interface device for receiving input audio signals (e.g., from music streaming services) to be rendered by the bass driver 108. The electronic components 118 can also include a microprocessor and an audio amplifier to process and amplify the audio signals. A power supply unit in the enclosure 102 powers the speaker 100.

As shown in FIGS. 1 and 7, the enclosure 102 includes a slot 120 configured to release acoustic energy from the bass driver 108 generally uniformly around a perimeter of the enclosure 102 creating a dispersion pattern specifically tailored to the desired acoustical performance.

The speaker 100 can also include one or more high frequency tweeters 122 mounted in the enclosure 102 above the bass driver 108. In the exemplary embodiment, the high frequency tweeters 122 have a forward-firing orientation in the enclosure 102.

A significant advantage of the speaker 100 is its dense arrangement of speaker components. The angled bass driver 108, the reflector-damper plate 116, the electronic subsystems 118, and the tweeters 122 can all be contained in a compact enclosure 102 having a small footprint area without compromising audio performance—particularly in the area of low-frequency acoustic bass output.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions.

Accordingly, the foregoing description and attached drawings are by way of example only, and are not intended to be limiting.

The invention claimed is:

1. A speaker device, comprising:

an enclosure having a top end, an opposite bottom end, and one or more sides connecting the top and bottom ends to define an internal space; and a bass driver mounted in the internal space of the enclosure for generating a bass output, the bass driver having a central axis oriented at an oblique angle relative to the top end and the bottom end of the enclosure, wherein the bass driver includes a diaphragm and a perimeter mounting plate around the diaphragm, wherein the perimeter mounting plate is adjacent to the one or more sides of the enclosure.

2. The speaker device of claim 1, further comprising an electronic processor, the electronic processor being coupled to the bass driver for receiving and processing input audio signals to be rendered by the bass driver.

3. The speaker device of claim 2, wherein the electronic processor is coupled to a network interface, a power supply unit, and/or an audio amplifier.

4. The speaker device of claim 1, further comprising an elastomeric reflector-damper plate spaced apart from the bass driver in the internal space in the enclosure, the reflector-damper plate configured to radially disperse low to midrange audio frequencies of the bass output of the bass driver around the enclosure to reduce acoustic frequency distortion.

5. The speaker device of claim 4, wherein the elastomeric reflector-damper plate is mounted in the enclosure above the bass driver and configured to distribute specific frequencies of the bass driver in a controlled distribution pattern around the enclosure.

6. The speaker device of claim 4, wherein the elastomeric reflector-damper plate is mounted in the enclosure above and substantially parallel to the bass driver.

7. The speaker device of claim 4, wherein the elastomeric reflector-damper plate is configured to either reflect or absorb specific audio frequencies of the bass driver to both smooth frequency response and reduce acoustic frequency distortion.

8. The speaker device of claim 4, wherein the elastomeric reflector-damper plate comprises a siliconized rubber material.

9. The speaker device of claim 4, wherein the elastomeric reflector-damper plate has a Shore durometer range of 70-90.

10. The speaker device of claim 1, wherein the enclosure is generally cylindrical in shape.

11. The speaker device of claim 1, wherein the enclosure comprises an injection-molded plastic material.

12. The speaker device of claim 1, further comprising a slot in the enclosure configured to release acoustic energy from the bass driver generally uniformly around a perimeter of the enclosure creating a dispersion pattern tailored to a desired acoustical performance.

13. The speaker device of claim 1, further comprising one or more forward-firing high frequency tweeters in the enclosure.

14. The speaker device of claim 13, further comprising an elastomeric reflector-damper plate spaced apart from the bass driver in the internal space in the enclosure, the reflector-damper plate configured to radially disperse low to midrange audio frequencies of the bass output of the bass driver around the enclosure to reduce acoustic frequency distortion, wherein the elastomeric reflector-damper plate is mounted in the enclosure above and substantially parallel to the bass driver, wherein an electronic processor is mounted below the bass driver, and wherein the one or more forward-firing high frequency tweeters are mounted in the enclosure above the elastomeric reflector-damper plate.

15. The speaker device of claim 1, wherein the oblique angle is 45 degrees.

16. The speaker device of claim 1, wherein the bass driver is a subwoofer driver.

17. A speaker device, comprising:

an enclosure having a top end, an opposite bottom end, and one or more sides connecting the top and bottom ends to define an internal space; and a bass driver mounted in the internal space of the enclosure for generating a bass output, the bass driver having a central axis along which a piston area of the bass driver actuates oriented at an oblique angle relative to the bottom end of the enclosure, wherein the bass driver includes a diaphragm and a perimeter mounting plate around the diaphragm, wherein the perimeter mounting plate is adjacent to the one or more sides of the enclosure.

18. The speaker device of claim 17, further comprising an electronic processor, the electronic processor being coupled to the bass driver for receiving and processing input audio signals to be rendered by the bass driver.

19. The speaker device of claim 18, wherein the electronic processor is coupled to a network interface, a power supply unit, and/or an audio amplifier.

20. The speaker device of claim 19, further comprising an elastomeric reflector-damper plate spaced apart from and above the bass driver in the internal space in the enclosure, the reflector-damper plate configured to radially disperse low to midrange audio frequencies of the bass output of the bass driver in a controlled distribution pattern around the enclosure to further reduce acoustic frequency distortion.

21. The speaker device of claim 20, wherein the elastomeric reflector-damper plate is configured to either reflect or absorb specific audio frequencies of the bass driver to both smooth frequency response and reduce acoustic frequency distortion.

22. The speaker device of claim 20, wherein the elastomeric reflector-damper plate comprises a siliconized rubber material.

23. The speaker device of claim 20, wherein the elastomeric reflector-damper plate has a Shore durometer range of 70-90.

24. The speaker device of claim 17, wherein the enclosure is generally cylindrical in shape.

25. The speaker device of claim 17, further comprising a slot in the enclosure configured to release acoustic energy from the bass driver generally uniformly around a perimeter of the enclosure creating a dispersion pattern tailored to the desired acoustical performance.

26. The speaker device of claim 17, further comprising one or more forward-firing high frequency tweeters mounted in the enclosure above an elastomeric reflector-damper plate.

27. The speaker device of claim 17, wherein the oblique angle is 45 degrees.

28. The speaker device of claim 17, wherein the bass driver is a subwoofer driver.

29. A speaker device, comprising:

an enclosure having a top end, an opposite bottom end, and one or more sides connecting the top and bottom ends to define an internal space;

a bass driver mounted in the internal space of the enclosure for generating a bass output, the bass driver having a central axis oriented at an oblique angle relative to the top end and the bottom end of the enclosure; and an elastomeric reflector-damper plate spaced apart from the bass driver in the internal space in the enclosure, the reflector-damper plate configured to radially disperse low to midrange audio frequencies of the bass output of the bass driver around the enclosure.

30. The speaker device of claim 29, further comprising an electronic processor, the electronic processor being coupled to the bass driver for receiving and processing input audio signals to be rendered by the bass driver.

31. The speaker device of claim 30, wherein the electronic processor is coupled to a network interface, a power supply unit, and/or an audio amplifier.

32. The speaker device of claim 29, wherein the elastomeric reflector-damper plate is mounted in the enclosure above the bass driver and configured to distribute specific frequencies of the bass driver in a controlled distribution pattern around the enclosure.

33. The speaker device of claim 29, wherein the elastomeric reflector-damper plate is mounted in the enclosure above and substantially parallel to the bass driver.

34. The speaker device of claim 29, wherein the elastomeric reflector-damper plate is configured to either reflect or absorb specific audio frequencies of the bass driver to both smooth frequency response and reduce acoustic frequency distortion.

35. The speaker device of claim 29, wherein the elastomeric reflector-damper plate comprises a siliconized rubber material.

36. The speaker device of claim 29, wherein the elastomeric reflector-damper plate has a Shore durometer range of 70-90.

37. The speaker device of claim 29, wherein the enclosure is generally cylindrical in shape.

38. The speaker device of claim 29, wherein the enclosure comprises an injection-molded plastic material.

39. The speaker device of claim 29, further comprising a slot in the enclosure configured to release acoustic energy from the bass driver generally uniformly around a perimeter of the enclosure creating a dispersion pattern tailored to a desired acoustical performance.

40. The speaker device of claim 29, further comprising one or more forward-firing high frequency tweeters in the enclosure.

41. The speaker device of claim 40, wherein the elastomeric reflector-damper plate is mounted in the enclosure above and substantially parallel to the bass driver, wherein an electronic processor is mounted below the bass driver, and wherein the one or more forward-firing high frequency tweeters are mounted in the enclosure above the elastomeric reflector-damper plate.

42. The speaker device of claim 29, wherein the oblique angle is 45 degrees.

43. The speaker device of claim 29, wherein the bass driver is a subwoofer driver.

44. A speaker device, comprising:

an enclosure having a top end, an opposite bottom end, and one or more sides connecting the top and bottom ends to define an internal space;

a bass driver mounted in the internal space of the enclosure for generating a bass output, the bass driver having a central axis along which a piston area of the bass driver actuates oriented at an oblique angle relative to the bottom end of the enclosure; and an elastomeric reflector-damper plate spaced apart from and above the bass driver in the internal space in the enclosure, the reflector-damper plate configured to radially disperse low to midrange audio frequencies of the bass output of the bass driver in a controlled distribution pattern around the enclosure to further reduce acoustic frequency distortion.

45. The speaker device of claim 44, further comprising an electronic processor, the electronic processor being coupled to the bass driver for receiving and processing input audio signals to be rendered by the bass driver.

46. The speaker device of claim 44, wherein the elastomeric reflector-damper plate is configured to either reflect or absorb specific audio frequencies of the bass driver to both smooth frequency response and reduce acoustic frequency distortion.

47. The speaker device of claim 44, wherein the elastomeric reflector-damper plate comprises a siliconized rubber material.

48. The speaker device of claim 44, wherein the elastomeric reflector-damper plate has a Shore durometer range of 70-90.

49. The speaker device of claim 44, wherein the enclosure is generally cylindrical in shape.

50. The speaker device of claim 44, further comprising a slot in the enclosure configured to release acoustic energy from the bass driver generally uniformly around a perimeter of the enclosure creating a dispersion pattern tailored to the desired acoustical performance.

51. The speaker device of claim 44, further comprising one or more forward-firing high frequency tweeters mounted in the enclosure above the elastomeric reflector-damper plate.

52. The speaker device of claim 44, wherein the oblique angle is 45 degrees.

53. The speaker device of claim 44, wherein the bass driver is a subwoofer driver.

* * * * *